United States Patent Office
3,542,546
Patented Nov. 24, 1970

3,542,546
ORGANIC PHOTOCONDUCTORS CONTAINING THE >N—N< NUCLEUS
Charles J. Fox, Rochester, N.Y., assignor to Eastman Kodak Company, Rochester, N.Y., a corporation of New Jersey
No Drawing. Continuation-in-part of application Ser. No. 597,562, Nov. 29, 1966. This application Oct. 9, 1967, Ser. No. 673,962
Int. Cl. G03g 5/06
U.S. Cl. 96—1.5
29 Claims

ABSTRACT OF THE DISCLOSURE

Certain organic compounds having a >N—N< nucleus are useful as photoconductors in xerographic systems.

This application is a continuation-in-part of Ser. No. 597,562, filed Nov. 29, 1966, now abandoned.

This invention relates generally to photoconductive organic compounds and to certain aromatic hydrazines having photoconductive properties which are useful as photoconductors in electrophotographic elements.

Organic photoconductor-containing compositions have been widely used in the preparation of electrophotographic elements. Many film-forming compositions comprising photoconductive arylamines, such as triphenylamine and polyvinyl carbazole, have been coated to provide photoconductive elements useful in many electrophotographic processes. Some organic photoconductor-containing compositions have been used for their ability to form transparent electrophotographic elements which can be exposed by reflex and bireflex procedures and toned to produce dense images on a transparent background. Unfortunately, the presently available photoconductive compounds capable of producing transparent films do not exhibit as great an electrophotosensitivity to light as non-transparent materials such as selenium or zinc oxide-resin xerographic coatings. Most compounds are also difficult to prepare reproducibly in sufficient concentrations to form stable, uniform coatings having the desired electrophotographic properties. Moreover, such compounds cannot readily be spectrally sensitized by the addition of currently available dye sensitizers. Due to these deficiencies there is a need for organic photoconductor compounds which are capable of being used in the preparation of improved transparent reusable electrophotographic elements which will have a desirable spectral response, stability, and enhanced electrophotosensitivity.

It is, therefore, an object of this invention to provide improved novel organic photoconductors which have high electrophotosensitivity and stability and which can be efficiently spectrally sensitized with known spectral sensitizers. It is another object to provide novel organic photoconductor-containing compositions which can be reproducibly coated to yield uniform photoconductive layers having excellent stability even under adverse storage conditions. It is another object to provide transparent electrophotographic elements having the high speed and excellent stability characteristic of the novel organic photoconductive compounds of this invention. It is a further object of this invention to produce images electrophotographically by reflex and bireflex processes using coated elements having layers comprising organic photoconductor compounds of this invention. The above and further objects and advantages of this invention will be apparent from the following description and examples.

It has been discovered according to this invention that certain compounds which contain an >N—N< nucleus such as the N,N-bicarbazyls and tetra-substituted hydrazines are capable of providing the kind and quality of photoconductive properties necessary for the preparation of the electrophotographic elements described herein.

The particular N,N-bicarbazyls which have been found to exhibit the advantages of this invention include substituted N,N-bicarbazyls as well as unsubstituted N,N-bicarbazyl. Typically, either or both carbazolyl nuclei of the N,N-bicarbazyl can be substituted by:

(a) An alkyl radical including a substituted alkyl radical such as a haloalkyl or an alkoxyalkyl radical,
(b) A phenyl radical including a substituted phenyl radical such as a naphthyl, an aminophenyl or a hydroxyphenyl radical,
(c) A halogen atom,
(d) An amino radical including substituted as well as unsubstituted amino radicals such as an alkylamino or a phenylalkylamino radical,
(e) An alkoxy radical,
(f) A hydroxyl radical,
(g) A cyano radical,
(h) A heterocyclic radical such as a pyrazyl, a carbazolyl or a pyridyl radical. The preferred N,N-bicarbazyl compounds include unsubstituted N,N-bicarbazyl and those N,N-bicarbazyls which are substituted by at least one carbazolyl radical such as a cyclotetrakis-carbazolylene. The N,N-bicarbazyl photoconductors of this invention are characterized by the following formula:

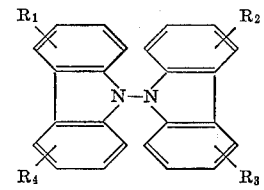

wherein:

$R_1$, $R_2$, $R_3$, and $R_4$ represent the same or different substituents including:

(a) phenyl,
(b) lower alkyl,
(c) halogen,
(d) amino,
(e) lower alkoxy,
(f) hydroxy,
(g) cyano,
(h) pyrazyl,
(i) carbazoyl,
(j) pyridyl or
(k) hydrogen.

The tetra-substituted hydrazines which have been found to exhibit electrophotographic properties in accordance with this invention are those which contain substituents which are substituted or unsubstituted phenyl radicals, or heterocyclic radicals having 5 to 6 atoms in the hetero nucleus. However, more suitable results are obtainable if all four substituents are not unsubstituted phenyl radicals, i.e., if at least one substituent is a substituted phenyl radical or a heterocyclic radical having 5 to 6 atoms in the hetero nucleus. A substantial increase is noted in the photoconductive properties if at least one substituent attached to each nitrogen atom of the hydrazine nucleus is a substituted phenyl radical or a heterocyclic radical as described above. The preferred tetra-substituted hydrazines of this invention include those having the following formula:

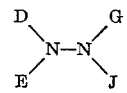

wherein:

D, E, G and J are each either (a) A substituted phenyl radical such as a naphthyl radical, an alkylphenyl radical, a halophenyl radical, a hydroxyphenyl radical, a haloalkylphenyl radical or a hydroxyalkylphenyl radical or (b) A heterocyclic radical such as an imidazolyl radical, a furyl radical or a pyrazoline radical. In addition, J and E can also be (c) An unsubstituted phenyl radical. Especially preferred are those tetra-substituted hydrazines wherein both D and G are either substituted phenyl radicals are heterocyclic radicals.

Typical compounds which belong to the herein-described general classes include the following:

(I) tetra-α-naphthylhydrazine
(II) tetra(3-methyl-4-hydroxyphenyl)hydrazine
(III) tetra(m-hydroxyethylphenyl)hydrazine
(IV) tetra(2-methyl-5-chloroethylphenyl)hydrazine
(V) tetra(2-methyl-5-hydroxyphenyl)hydrazine
(VI) tetra(1-imidazolyl)hydrazine
(VII) N,N-di-α-naphthyl-N',N'-di(3-methyl-4-hydroxyphenyl)hydrazine
(VIII) N-3-furyl-N-(2-methyl-4-hydroxyphenyl)-N',N'-di-β-naphthylhydrazine
(IX) tetra-β-naphthylhydrazine
(X) N,N'-di-β-naphthyl-N,N'-diphenylhydrazine
(XI) tetra-4-tolylhydrazine
(XII) N,N'-diphenyl-N,N'-di(3-methyl-4-hydroxyphenyl)hydrazine
(XIII) N,N'-diphenyl-N,N'-di-p-chlorophenyl hydrazine
(XIV) phenyltri-(2-methyl-5-hydroxyphenyl)hydrazine
(XV) N,N-bicarbazyl
(XVI) cyclotetrakis(3,9-carbazolylene)
(XVII) 6-(3-carbazolyl)-cyclotetrakis(3,9-carbazolylene)
(XVIII) 6-(9-carbazolyl)-cyclotetrakis(3,9-carbazolylene)
(XIX) 3,3'-bis(3-carbazolyl)-9,9'-bicarbazolyl
(XX) 3-(3-carbazolyl)-9-(9-carbazolyl)carbazole
(XXI) 3-(9-carbazolyl)-9,9'-bicarbazolyl
(XXII) 3,3'-diethyl-9,9'-bicarbazolyl
(XXIII) 3,3'-diphenyl-9,9'-bicarbazolyl
(XXIV) 3,3'-dichloro-9,9'-bicarbazolyl
(XXV) 4,4'-bis(diethylamino)-9,9'-bicarbazolyl
(XXVI) 3,3'-diethoxy-9,9'-bicarbazolyl
(XXVII) 1,1'-dihydroxy-9,9'-bicarbazolyl
(XXVIII) 2,2'-dicyano-9,9'-bicarbazolyl
(XXIX) tetra(p-diethylaminophenyl)hydrazine In the preferred practice of this invention at least two of the carbazole units in the compounds combining two or more such units should be linked by means of a single bond between the nitrogen atoms of each carbazole unit. The photoconductive effectiveness of the resulting compounds has been found to be related qualitatively to the mole fraction of the total carbazole content which occurs in this form. Thus Compound XVI is a more effective photoconductor than Compound XIX, and Compound XV is more effective than Compounds XXX and XXXI listed below.

(XXX) 1-carbazolyl-9-carbazole
(XXXI) 3-(9-carbazolyl)carbazole

As previously described the preferred tetraarylhydrazines of the invention include those having at least one substituted phenyl radical or at least one heterocyclic radical having 5 to 6 atoms in the hetero nucleus on each nitrogen atom. The less fully substituted analogous compounds, such as tetraphenylhydrazine, do not approach the high level of stability and electrophotosensitivity of the preferred compounds of the invention.

The following syntheses are exemplary of the preparation of compounds and intermediates for compounds included by the general formula disclosed herein.

EXAMPLE 1

Synthesis of tetraphenylhydrazine

To a continuously stirred solution of 16.9 grams (0.1 mole) of diphenylamine in 200 ml. acetone at 25° C., was added over a period of two hours, 6.9 grams (0.044 mole) of potassium permanganate dissolved in acetone. After stirring for four hours at room temperature the precipitate formed was filtered off and the solvent removed under reduced pressure. This residue was dissolved in tetrahydrofuran and the tetraphenylhydrazine precipitated by the addition of 200 ml. of methanol. 2.3 grams of light tan powder was obtained which, after filtration and washing with methanol, had a M.P. 145°–148° C.; and the following elemental analysis:

Analysis.—Calcd. for $C_{24}H_{20}N_2$ (percent): C, 85.7; H, 5.9; N, 8.4. Found (percent): C, 85.8; H, 5.3; N, 7.7.

EXAMPLE 2

Synthesis of tetra-4-tolylhydrazine (XI)

Powdered potassium permanganate, 8 grams (.05 mole) was added over two hours with continuous stirring at 25° C. to a previously prepared solution of di-4-tolylamine, 9.8 grams (.05 mole) in 250 ml. of acetone. Stirring was continued for six hours and the mixture allowed to stand overnight. The brown precipitate was filtered off, the filtrate concentrated to 100 ml., and the solution cooled in ice, resulting in the separation of 5.4 grams (0.014 mole, 55 mole percent yield) of yellow crystals having a M.P. of 138°–139° C., and the following elemental analysis:

Analysis.—Calcd. for $C_{28}H_{28}N_2$ (percent): C, 85.7; H, 7.2; N, 7.2. Found (percent): C, 85.0; H, 7.2; N, 7.0.

EXAMPLE 3

Synthesis of tetra-β-naphthylhydrazine (IX)

To a solution of 5.4 grams (.02 mole) of di-2-naphthylamine in 100 ml. acetone, 3.2 grams (.02 mole) of powdered potassium permanganate were added in portions during 30 minutes. The complete mixture was stirred for four hours at a temperature of 25° C. The precipitate of inorganic products was removed by filtration. The filtrate was concentrated to 50 ml. and chilled in ice. An off-white precipitate separated weighing 2.0 grams having a M.P. of 192°–195° C. and the following elemental analysis:

Analysis.—Calcd. for $C_{40}H_{28}N_2$ (percent): C, 89.5; H, 5.2; N, 5.2. Found (percent): C, 89.6; H, 5.0; N, 5.0.

EXAMPLE 4

Synthesis of N,N'-diphenyl-N,N'-di-2-naphthylhydrazine (X)

A solution consisting of 10.8 grams (.05 mole) of phenyl-2-naphthylamine in 500 ml. of acetone cooled to 7° C. was prepared. To this solution 7.6 grams (.05 mole) of powdered potassium permanganate was added in portions with stirring over a two-hour period. The resulting solution was maintained at 7° C. and stirred for an additional six hours, and allowed to stand overnight at 25° C. The resulting precipitate was isolated as in the preceding example. A light brown solid precipitate weighed 7.5 grams, had a M.P. 70°–71° and was analyzed to produce the following elemental analysis:

Analysis.—Calcd. for $C_{32}H_{24}N_2$ (percent): C, 88.1; H, 5.5; N, 6.4. Found (percent): C, 88.0; H, 5.3; N, 6.2.

EXAMPLE 5

Compounds XV through XXI, XXX and XXXI were prepared as follows:

A solution of 33.6 grams (0.2 mole) of carbazole dissolved in 300 ml. of acetone was refluxed and a 31.6 gram (0.2 mole) quantity of powdered potassium permanganate added with stirring in four equal portions of 7.9 grams each. The second addition was made 15 minutes after the first and the third and fourth at succeeding 1-hour intervals. The stirring and refluxing was continued for 3 hours. The mixture was then cooled, the inorganic solids filtered off, and the acetone removed from the filtrate under reduced pressure. The residue was dissolved in 100 ml. of benzene and the solution chilled to about 7° C. and held overnight. Crystals of the arylhydrazine, N,N-dicarbazyl (Compound XV), (6.5 grams, 0.02 mole, 20 percent yield) were filtered off, washed with cold acetone, and recrystallized from acetone. The M.P. of these crystals was 218°–219° C. The benzene was removed from the filtrate under reduced pressure leaving a residue which was then dissolved in 100 ml. of warm 2-methoxyethanol and the solution chilled to about 7° C. and held overnight. 3.5 grams of the arylhydrazine (Compound XVI) (.005 mole, 10 percent yield) separated, was filtered off and washed with cold (7° C.) 2-methoxyethanol. The melting point of the dried precipitate was 202°–205° C. The filtrate was warmed to room temperature, and 250 ml. of methanol were added. This mixture causes a mixture of further arylhydrazines, identified as the trimer, tetramer, and pentamer of carbazole (11 grams, 33 percent yield) to precipitate. The addition of water to the resulting filtrate gave a further precipitate of dimers of carbazole (9 grams, 27 percent yield). The mixtures of trimers, tetramers, pentamers and dimers were separated into individual compounds by further fractional crystallizations employing 2-methoxyethanol, methanol, and water. Thirteen fractions were isolated. Compounds XV, XVI, XVII, XVIII, XIX, XX, XXI, XXX, and XXXI were identified by analysis. The melting points and molecular weights determined are shown below:

| Compound: | M.P.° C. | M.W. |
| --- | --- | --- |
| XV | 218 | 332 |
| XVI | 202 | 625 |
| XVII | 217 | 789 |
| XVIII | 255 | 777 |
| XIX | 255 | 647 |
| XX | 200 | [1] 487 |
| XXI | 195 | 432 |
| XXX | 175 | 295 |
| XXXI | 140 | 346 |

[1] Average.

Compounds XXII to XXIX are prepared in the same general manner as compounds XV to XXI except that the appropriate substituted carbazole is used as the starting material in place of the unsubstituted material.

In preparing electrophotographic elements utilizing the photoconductive compounds of this invention, the photoconductive composition may be formulated and coated with or without a binder. When a binder is employed, the compound is dissolved in a solution of binder and solvent and then, after thorough mixing, the composition is coated on an electrically conducting support in a well-known manner, such as swirling, spraying, doctor-blade coating, and the like.

Preferred binders for use in preparing the photoconductive layers comprise polymers having fairly high dielectric strength which are good electrically insulating film-forming vehicles. Materials of this type comprise styrene-butadiene copolymers; silicone resins; styrene-alkyd resins; silicone-alkyd resins; soya-alkyd resins; poly(vinyl chloride); poly (vinylidene chloride); vinylidene chloride-acrylonitrile copolymers; poly(vinyl acetate); vinyl acetate-vinyl chloride copolymers; poly(vinyl acetals), such as poly(vinyl butyral); polyacrylic and methacrylic esters, such as poly(methylmethacrylate), poly(n-butylmethacrylate), poly(isobutyl methacrylate), and the like; polystyrene; nitrate polystyrene; polymethylstyrene; isobutylene polymers; polyesters, such as poly(alkylene terephthalates); phenol - formaldehyde resins; ketone resins; polyamides; and polydiarylalkanes such as polycarbonates and polythiocarbonates. Methods of making resins of this type have been extensively described, for example, styrene-alkyd resins can be prepared according to the method described in U.S. Pats. 2,361,019 and 2,258,423. Suitable resins of the type contemplated for use in the preparation of photoconductive layers are sold under such trade names as Vitel PE–101, Cymac, Piccopale 100, Lexan 105 and Saran F–220. Other types of binders which can be used in the photoconductive layers of the invention include such materials as paraffin, mineral waxes, and the like.

Solvents useful for preparing coating compositions with the compounds of the present invention can include a wide variety of organic solvents for the components of the coating composition. For example, benzene; toluene; acetone; 2-butanone; chlorinated hydrocarbons such as methylene chloride; ethylene chloride; and the like; ethers, such as tetrahydrofuran and the like, or mixtures of such solvents can advantageously be employed in the practice of this invention.

In preparing the coating compositions utilizing the compounds disclosed herein useful results are obtained where the photoconductive substance is present in an amount equal to at least about 1 weight percent of the coating composition. The upper limit in the amount of photoconductive material present can be widely varied in accordance with usual practice. In those cases where a binder is employed, it is normally required that the photoconductive material be present in an amount from about 1 weight percent of the coating composition to about 99 weight percent of the coating composition. A preferred weight range for the photoconductive material in the coating composition is from about 10 weight percent to about 60 weight percent.

Coating thicknesses of the photoconductive composition on a support can vary widely. Normally, a wet coating thickness in the range of about 0.001 inch to about 0.01 inch is useful in the practice of the invention. A preferred range of coating thickness is from about 0.002 inch to about 0.006 inch before drying although such thicknesses can vary widely depending on the particular application desired for the electrophotographic element.

Suitable supporting materials for coating the photoconductive layers of the present invention can include any of the electrically conducting supports, for example, paper (at a relative humidity above 20 percent); aluminum-paper laminates; metal foils, such as aluminum foil, zinc foil, etc.; metal plates, such as aluminum, copper, zinc, brass, and galvanized plates; vapor deposited metal layers such as nickel or aluminum and the like.

An especially useful conducting support can be prepared by coating a support material such as polyethylene terephthalate with a layer containing a semiconductor dispersed in a resin. Likewise, a suitably conducting coating can be prepared from the sodium salt of a carboxyester lactone of maleic anhydride and a vinyl acetate polymer. Such kinds of conducting layers and methods for their optimum preparation and use are disclosed in U.S. 3,007,901 and 3,267,807.

The photoconductive layers of the invention can also be sensitized by the addition of effective amounts of sensitizing compounds to exhibit improved electrophotosensitivity. Sensitizing compounds useful with the photoconductive compounds of the present invention can be selected from a wide variety of materials including such materials as pyrylium, thiapyrylium, and selenapyrylium dye salts disclosed in VanAllan et al. U.S. Pat. 3,250,615; fluorenes, such as 7,12-dioxo - 13 - dibenzo(a,h)fluorene, 5,10-dioxo - 4a,11 - diazabenzo(b)fluorene, 3,13-dioxo-7-oxadibenzo(b,g)fluorene, and the like; aromatic nitro compounds of the kinds described in U.S. Pat. 2,610,120; anthrones like those disclosed in U.S. Pat. 2,670,285; quinones, U.S. Pat. 2,670,286; benzophenones U.S. Pat. 2,670,287; thiazoles U.S. Pat. 2,732,301; mineral acids; carboxylic acids, such as maleic acid, dichloroacetic acid, and salicyclic acid; sulfonic and phosphoric acids; and various dyes, such as cyanine, carbocyanine, merocyanine, diarylmethane, thiazine, azine, oxazine, xanthene, phthalein, acridine, azo, anthraquinone dyes and the like and mixtures thereof. The sensitizers preferred for use with the compounds of this invention are selected from pyrylium and thiapyrylium salts, fluorenes, carboxylic acids and triphenylmethane dyes.

Where a sensitizing compound is employed with the compounds of the invention to form a sensitized electrophotographic element, it is the normal practice to mix a suitable amount of the sensitizing compound with the coating composition so that, after thorough mixing, the sensitizing compound is uniformly distributed in the coated element. Other methods of incorporating the sensitizer or the effect of the sensitizer may, however, be employed consistent with the practice of this invention. In preparing the photoconductive layers, no sensitizing compound is required to give photoconductivity in the layers which contain the photoconducting substances of this invention, therefore, no sensitizer is required in a particular photoconductive layer. However, since relatively minor amounts of sensitizing compound give substantial improvement in speed in such layers, the sensitizer is preferred. The amount of sensitizer that can be added to a photoconductor-incorporating layer to give effective increases in speed can vary widely. The optimum concentration in any given case will vary with the specific photoconductor and sensitizing compound used. In general, substantial speed gains can be obtained where an appropriate sensitizer is added in a concentration range from about 0.0001 to about 30 percent by weight based on the weight of the film-forming coating composition. Normally, a sensitizer is added to the coating composition in an amount by weight from about 0.005 to about 5.0 percent by weight of the total coating composition.

The use of the compounds in this invention will now be described by reference to the following examples.

EXAMPLE 6

A solution of tetraphenylhydrazine was made for coating on a support material by mixing 0.15 part of the hydrazine with 0.002 part of 2,6-(4-ethylphenyl)-4-(4-n-amyloxyphenyl) thiapyrylium perchlorate (hereinafter referred to as "Sensitizer A") and dissolving these together with 0.5 part by weight of a resinous polyester binder with suitable stirring in methylene chloride. The resultant mixture was then hand-coated on an aluminum-laminated paper support. The polyester used is a copolymer of terephthalic acid and a glycol mixture comprising a 9:1 wt. ratio of 2,2-bis[4-($\beta$-hydroxyethoxy)phenyl]propane and ethylene glycol. The wet coating thickness on the support was 0.004 inch. After drying, the electrophotographic element was employed in a standard xerographic process which included charging under a positive corona and exposure from behind a positive-appearing line transparency to a 3000° K. tungsten source of 20-foot-candle illuminance at the exposure surface. The coated surface of the element was dusted with an electrostatically attractable powder having optical density according to the method and materials described in U.S. Pat. 2,297,691. No image was obtained.

EXAMPLE 7

The procedure of Example 6 was followed in preparing an electrophotographic element using 0.15 part tetra-4-tolylhydrazine (Compound XI) as the photoconductor in the coating composition. Exposure of the element and development by the method of Example 6 produced a visible image.

EXAMPLE 8

The procedure of Example 6 was followed in preparing an electrophotographic element using 0.15 part tetra-$\beta$-naphthylhydrazine (Compound IX) as the photoconductor in the coating composition. Exposure of the element and development produced a visible image.

EXAMPLE 9

The procedure of Example 6 was followed in preparing a coating solution containing 0.15 part N,N'-diphenyl-N,N'-di-$\beta$-naphthylhydrazine (Compound X) as the photoconductor and 0.001 part Sensitizer "A" as the sensitizing compound. The solution was coated at a dried thickness of 0.003 in. onto a conductive coating comprising the sodium salt of a resinous carboxyester lactone, as disclosed in Minsk U.S. Pat. 3,262,807, which was previously coated onto a gel-subbed cellulose triacetate support containing finely divided titanium dioxide. The element thus produced was charged, sandwiched with the coated surface facing a printed document, and reflex exposed with the support side spaced 5 inches from a 100-watt tungsten light for ten seconds. The document and photoconductive element were then stripped apart, and the coated side of the photoconductor dusted with an electrostatically attractable powder having optical density in the manner of Example 6. A good quality laterally reversed image of the document was obtained. This image was then transferred to a sheet of plain white paper by known techniques, and the paper heated to fix the image thereto.

EXAMPLE 10

The coating composition of Example 9 was coated to form an element as in Example 9 except that the support used was clear cellulose triacetate. Following charging, exposure was made by sandwiching a printed document with the support side of the photoconductive element, and exposing in the device used in Example 9 by placing the support surface of the element toward the exposing lamps. After exposure, the charged surface was dusted with electrostatically attractable powder, and a wrong-reading image seen to form thereon. This image was then transferred to a lithographic printing master, to which it was fixed by passing the master briefly under an infrared lamp. After treatment with a conversion solution, the master was placed on a press, and 500 copies of good quality were made.

EXAMPLE 11

Elements prepared according to Example 6 containing photoconductors as tabulated herein and containing Sensitizer A, and a control element containing Sensitizer A without photoconductor were tested by the following procedure. Each element was charged under positive corona source until the surface potential, as measured by an electrometer probe, reached 600 volts. The elements were then individually exposed to a light source in the manner of Example 6, with the exception that the positive transparency was replaced by a stepped density gray scale. The actual positive electrical H and D speeds of each coating was determined in the following manner. Each element was electrostatically charged under a corona source until the surface potential, as measured by an electrometer probe, reached about 600 volts. The charged element was then exposed to a light source through a transparent stepped density gray scale. The exposure caused reduction of the surface potential of the element under each step of the gray scale from its initial potential, Vo, to some lower potential, V, whose exact value depended on the actual amount of exposure in meter-candle-seconds received by the area. The results of these measurements were then plotted on a graph of surface potential V vs. log exposure for each step. The actual positive speed of the element can then be expressed in terms of the reciprocal of the exposure required to reduce the surface potential to any arbitrarily selected value. Herein, the actual posiitve speed is the numerical expression of $10^4$ divided by the exposure in meter-candle-seconds required to reduce the 600 volt charged surface potential by 100 volts.

Photoconductor: Speed
- None — 15
- IX — 60
- X — 75
- XI — 60
- XV — 400
- XVI — 400
- XVII — 400
- XVIII — 400
- XIX — 220
- XX — 320
- XXI — 400
- XXX — 30
- XXXI — 200

EXAMPLE 12

Elements prepared according to the procedure of Example 6, but containing as photoconductor N,N-bicarbazyl (Compound XV) and one of the following sensitizers were tested according to the procedure of Example 11.

Sensitizer B—2,4 - bis(4 - ethoxyphenyl)-6-(4-n-amyloxystyryl)pyrylium fluoroborate Sensitizer D—2,4 - bis(4-ethylphenyl)-6-(4-styrylstyryl)-pyrylium perchlorate The results are summarized in the table below:

Sensitizer: Speed
- B — 400
- D — 560

The compositions of the present invention can be employed in photoconductive elements useful in any of the well-known electrophotographic processes which require photoconductive layers. One such process is the xerographic process. In a process of this type, an electrophotographic element held in the dark is given a blanket electrostatic charge by placing it under a corona discharge to give a uniform charge to the surface of the photoconductive layer. This charge is retained by the layer owing to the substantial dark insulating property of the layer, i.e., the low conductivity of the layer in the dark. The electrostatic charge formed on the surface of the photoconductive layer is then selectively dissipated from the surface of the layer by imagewise exposure to light by means of a conventional exposure operation such as, for example, by a contact-printing technique, or by lens projection of an image, or reflex or bireflex techniques and the like, to thereby form a latent electrostatic image in the photoconductive layer. Exposing the surface in this manner forms a pattern of electrostatic charge by virtue of the fact that light energy striking the photoconductor causes the electrostatic charge in the light struck areas to be conducted away from the surface in proportion to the intensity of the illumination in a particular area.

The charge pattern produced by exposure is then developed or transferred to another surface and developed there, i.e., either the charged or uncharged areas rendered visible, by treatment with a medium comprising electrostatically responsive particles having optical density. The developing electrostatically responsive particles can be in the form of a dust, or powder and generally comprise a pigment in a resinous carrier called a toner. A preferred method of applying such a toner to a latent electrostatic image for solid area development is by the use of a magnetic brush. Methods of forming and using a magnetic brush toner applicator are described in the following U.S. Pats.: 2,786,439; 2,786,440; 2,786,441; 2,811,465; 2,874,063; 2,984,163; 3,040,704; 3,117,884; and reissue Re. 25,779. Liquid development of the latent electrostatic image may also be used. In liquid development the developing particles are carried to the image-bearing surface in an electrically insulating liquid carrier. Methods of development of this type are widely known and have been described in the patent literature, for example, U.S. Pat. 2,296,691 and in Australian Pat. 212,315. In dry developing processes the most widely used method of obtaining a permanent record is achieved by selecting a developing particle which has as one of its components a low-melting resin. Heating the powder image then causes the resin to melt or fuze into or on the element. The powder is, therefore, caused to adhere permanently to the surface of the photoconductive layer. In other cases, a transfer of the charge image or powder image formed on the photoconductive layer can be made to a second support such as paper which would then become the final print after developing and fuzing or fuzing respectively. Techniques of the types indicated are well known in the art and have been described in a number of U.S. and foreign patents, such as U.S. Pats. 2,297,691 and 2,551,582 and in "RCA Review," vol. 15 (1954) pages 469–484.

It will be apparent from the foregoing examples and description that the compositions of the present invention can be used in electrophotographic elements having many structural variations. For example, the photoconductive composition can be coated in the form of single layers or multiple layers on a suitable opaque or transparent conducting support. Likewise, the layers can be contiguous or spaced having layers of insulating material or other photoconducting material between layers or overcoated or interposed between the photoconducting layer or sensitizing layer and the conducting layer. It is also possible to adjust the position of the support and the conducting layer placing a photoconductor layer over a support and coating the exposed face of the support or the exposed or overcoated face of the photoconductor with a conducting layer. Configurations differing from those contained in the examples can be useful or even preferred for the same or different application for the electrophotographic element.

The invention has been described in detail with particular reference to preferred embodiments thereof, but it will be understood that variations and modifications can be effected within the spirit and scope of the invention as described hereinabove and as defined in the appended claims.

I claim:

1. An electrophotographic element comprising a conductive support having coated thereon a photoconductive composition comprising a photoconductor which is a N,N-bicarbazyl having the structure:

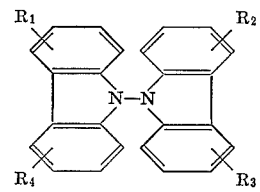

wherein:

$R_1$, $R_2$, $R_3$, and $R_4$ are each selected from the group consisting of:

(a) phenyl,
(b) lower alkyl,
(c) halogen,
(d) amino,
(e) lower alkoxy,
(f) hydroxy,
(g) cyano,
(h) pyrazyl,
(i) carbaxolyl,
(j) pyridyl and
(k) hydrogen, and an amount of a sensitizer effective for enhancing the electrophotosensitivity of said photoconductive composition.

2. The electrophotographic element of claim 1 wherein the sensitizer is selected from the group consisting of a pyrylium salt, a thiapyrylium salt, a selenapyrylium salt, a cyanine dye, a carbocyanine dye, a merocyanine dye, a fluorene, a triphenylmethane dye and mixtures thereof.

3. The electrophotographic element of claim 2 wherein the photoconductor is N,N-bicarbazyl.

4. The electrophotographic element of claim 2 wherein the photoconductor is cyclotetrakis(3,9-carbazolylene).

5. The electrophotographic element of claim 2 wherein the photoconductor is 6-(3-carbazolyl)-cyclotetrakis (3,9-carbazolylene).

6. The electrophotographic element of claim 2 wherein the photoconductor is 6-(9-carbazolyl)-cyclotetrakis (3,9-carbazolylene).

7. The electrophotographic element of claim 2 wherein the photoconductor is 3,3′-bis(3-carbazolyl)-9,9′-bicarbazolyl.

8. The electrophotographic element of claim 2 wherein the photoconductor is 3-(3-carbazolyl)-9-(9-carbazolyl) carbazole.

9. The electrophotographic element of claim 2 wherein the photoconductor is 3-(9-carbazolyl)-9,9′-bicarbazolyl.

10. An electrophotographic element comprising a conductive support having coated thereon a photoconductive composition comprising a photoconductor which has the formula:

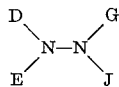

wherein:

D, E, G and J are each selected from the group consisting of an imidazolyl radical, a furyl radical, a naphthyl radical, an alkylphenyl radical, a halophenyl radical, a hydroxyphenyl radical, a haloalkylphenyl radical and a hydroxyalkylphenyl radical, and an amount of a sensitizer effective for enhancing the electrophosensitivity of said photoconductive composition.

11. The electrophotographic element of claim 10 wherein the sensitizer is selected from the group consisting of a pyrylium salt, a thiapyrylium salt, a selenapyrylium salt, a cyanine dye, a carbocyanine dye, a merocyanine dye, a fluorene, a triphenyl methane dye and mixtures thereof.

12. The electrophotographic element of claim 11 wherein the photoconductor is tetra-α-naphthylhydrazine.

13. The electrophotographic element of claim 11 wherein the photoconductor is tetra-o-cresylhydrazine.

14. The electrophotographic element of claim 11 wherein the photoconductor is tetra(m-hydroxyethylphenyl)hydrazine.

15. The electrophotographic element of claim 11 wherein the photoconductor is tetra(2-methyl-5-chloroethylphenyl)hydrazine.

16. The electrophotographic element of claim 11 wherein the photoconductor is tetra-p-cresylhydrazine.

17. The electrophotographic element of claim 11 wherein the photoconductor is tetra(imidazolyl)hydrozine.

18. The electroprotographic element of claim 11 wherein the photoconductor is N,N-di-α-naphthyl-N′,N′-di-o-cresylhydrazine.

19. The electrophotographic element of claim 11 wherein the photoconductor is N-furyl-N-m-cresyl-N′,N′-di-β-naphthylhydrazine.

20. The electrophotographic element of claim 11 wherein the photoconductor is tetra-β-naphthylhydrazine.

21. The electrophotographic element of claim 11 wherein the photoconductor is N,N′-di-2-naphthyl-N,N′-di-phenylhydrazine.

22. The electrophotographic element of claim 11 wherein the photoconductor is tetra-4-tolylhydrazine.

23. The electrophotographic element of claim 11 wherein the photoconductor is N,N′-diphenyl-N,N′-di-o-cresylhydrazine.

24. The electrophotographic element of claim 11 wherein the photoconductor is N,N′-diphenyl-N,N′-di-p-chlorophenylhydrazine.

25. The electrophotographic element of claim 11 wherein the photoconductor is phenyltri-p-cresylhydrazine.

26. A photoconductive element for use in electrophotography comprising a conductive support having coated thereon a photoconductive composition comprising:
(a) about 10 to 60% by weight based on said photoconductive composition of tetra-β-naphthylhydrazine,
(b) a film-forming, electrically insulating polymeric binder for said photoconductor, and
(c) a sensitizer for said photoconductor.

27. A photoconductive element for use in electrophotography comprising a conductive support having coated thereon a photoconductive composition comprising:
(a) about 10 to 60% by weight based on said photoconductive composition of N,N-bicarbazyl,
(b) a film-forming polymeric binder for said photoconductor, and
(c) a sensitizer for said photoconductor.

28. In an electrophotographic process wherein an electrostatic charge pattern is formed on a photoconductive element, the improvement characterized in that said photoconductive element has a photoconductive layer comprising an organic photoconductor having the formula:

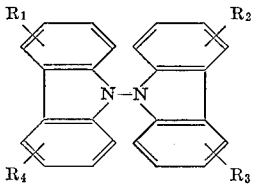

wherein:

$R_1$, $R_2$, $R_3$, and $R_4$ are each selected from the group consisting of:

(a) phenyl,
(b) lower alkyl,
(c) halogen,
(d) amino,
(e) lower alkoxy,
(f) hydroxy,
(g) cyano,
(h) pyrazyl,
(i) carbazolyl,
(j) pyridyl and
(k) hydrogen.

29. In an electrophotographic process wherein an electrostatic charge pattern is formed on a photoconductive element, the improvement characterized in that said photoconductive element has a photoconductive layer comprising an organic photoconductor having the formula:

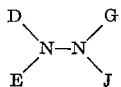

wherein:

D, E, G and J are each selected from the group consisting of an imidazoyl radical, a furyl radical, a naphthyl radical, an alkylphenyl radical, an halophenyl radical, an hydroxyphenyl radical, an haloalkylphenyl radical and an hydroxyalklphenyl radical.

References Cited

UNITED STATES PATENTS 3,066,023  11/1962  Schlesinger _____ 96—1.5 X
3,206,306  9/1965  Neugebauer et al. __ 260—315 X

FOREIGN PATENTS 1,254,023  12/1962  France.
1,314,030  11/1962  France.
1,016,969  1/1966  Great Britain.
937,496  9/1963  Great Britain.

DONALD LEVY, Primary Examiner

R. E. MARTIN, Assistant Examiner